United States Patent
Kamiya et al.

(10) Patent No.: US 6,923,513 B2
(45) Date of Patent: Aug. 2, 2005

(54) VEHICLE BRAKE SQUEAL CONTROL DEVICE

(75) Inventors: Masahiko Kamiya, Asahi-machi (JP); Hiroshi Kondo, Asahi-machi (JP); Shin Sasaki, Asahi-machi (JP); Daizo Oba, Asahi-machi (JP)

(73) Assignee: Advics Co., Ltd., Aichi (JP)

( * ) Notice: Subject to any disclaimer, the term of this patent is extended or adjusted under 35 U.S.C. 154(b) by 0 days.

(21) Appl. No.: 10/774,468

(22) Filed: Feb. 10, 2004

(65) Prior Publication Data

US 2004/0178675 A1 Sep. 16, 2004

(30) Foreign Application Priority Data

Mar. 13, 2003 (JP) .................................... 2003-068558

(51) Int. Cl.$^7$ ................................................ B60T 8/00
(52) U.S. Cl. ................... 303/191; 73/579; 188/73.37; 303/20
(58) Field of Search ............... 303/155, 20, DIG. 3, 303/191, 166, DIG. 4; 188/73.37, 72.1, 218 A, 73.36, 73.35, 73.1, 111 R, 1.11 W, 1.11 E; 701/71, 70; 73/579, 662

(56) References Cited

U.S. PATENT DOCUMENTS

| | | | | |
|---|---|---|---|---|
| 4,743,074 A | * | 5/1988 | Inoue | 303/191 |
| 5,687,818 A | * | 11/1997 | Nishizawa et al. | 188/73.35 |
| 5,865,515 A | * | 2/1999 | Nishizawa | 303/194 |
| 5,960,912 A | * | 10/1999 | Nishizawa et al. | 188/1.11 E |
| 6,047,794 A | * | 4/2000 | Nishizawa | 188/73.36 |
| 6,125,974 A | * | 10/2000 | Nishizawa et al. | 188/73.35 |
| 6,530,625 B2 | * | 3/2003 | Arnold et al. | 303/126 |
| 2004/0178675 A1 | * | 9/2004 | Kamiya et al. | 303/191 |
| 2004/0212246 A1 | * | 10/2004 | Kamiya et al. | 303/11 |

FOREIGN PATENT DOCUMENTS

| | | | |
|---|---|---|---|
| DE | 019804676 A1 | * | 8/1999 |
| JP | 9-221013 A | | 8/1997 |
| JP | 10-305768 | * | 11/1998 |
| JP | 10-329681 | * | 12/1998 |
| JP | 11-278229 | * | 10/1999 |
| JP | 2000-168539 A | | 6/2000 |
| JP | 2000-211493 | * | 8/2000 |
| JP | 2000-142342 | * | 5/2003 |

* cited by examiner

*Primary Examiner*—Douglas C. Butler
(74) *Attorney, Agent, or Firm*—Burns, Doane, Swecker & Mathis, LLP

(57) ABSTRACT

A brake squeal control device is proposed in which specific control for reducing brake squeals can be carried out to meet the will of a driver, and squeal control conditions for starting squeal reduction can be set individually to meet the requirements of drivers. Signals from wheel speed sensors, which indicate travel state, a hydraulic pressure sensor in a hydraulic circuit, which indicates the braking state, interior and exterior temperature sensors, which indicate the temperature state, and a manual switch operated by the will of a driver are sent to a control circuit. Conditions when squeals which the driver wishes to reduce or eliminate are produced, are stored in the control circuit, and when certain data are prepared, thereafter, by detecting the conditions at the time of generation, automatic squeal control is carried out.

5 Claims, 4 Drawing Sheets

VEHICLE BRAKE SQUEAL CONTROL DEVICE

BACKGROUND OF THE INVENTION

This invention relates to a vehicle brake squeal control device for suppressing so-called squeal produced from the brakes of a vehicle during braking.

So-called brake squeals produced during braking include noises of various vibration frequencies from relatively low frequency sounds called groaning to sounds heard as irritating sounds (squeal) in a vibration band of several KHz or over. In order to eliminate or reduce them, various measures have been proposed. As one example thereof, "vehicle brake hydraulic pressure control device" of JP patent publication 9-221013 is known. This control device has means for detecting brake squeals, and a control unit for changing distribution of brake hydraulic pressures to the front and rear wheels based on squeal detection signals detected by the detecting means to control such that if brake squeals are detected, the distribution of brake hydraulic pressure will be reduced for the front wheels and increased for the rear wheels.

As another example, the "brake pressure control device" disclosed by JP patent publication 2000-168539 aims to prevent a creep groan produced during creep traveling, in which brake fluid is set at first and second predetermined pressures, and while the brake pressure decreases from the first pressure to the second pressure, which is lower than the first, the brake cylinders are connected to the reservoir through solenoid valves to reduce the pressure, thereby preventing a creep groan. In this case, a creep groan, which is produced when the brake pedal is stepped in a travel range of an automatic transmission and the pedal stepping force is slightly relaxed with the vehicle at a stop, is prevented because even though the brake pressure decreases as a result of relaxing of the pedal stepping force, the brake cylinders are kept open until the second set pressure is reached.

Actually the first and second pressures are set by detecting whether the vibration level detected by a vibration sensor is over or under a reference value, and memorizing the brake hydraulic pressure at that time as the creep groan generation starting hydraulic pressure and the creep groan disappearing hydraulic pressure. If the hydraulic pressure during next braking is not more than the creep groan generation starting hydraulic pressure, the brake hydraulic pressure is reduced, and if it is not more than the disappearing hydraulic pressure, control is carried out such that it returns to a normal braking state.

As described above, noises produced by step-in of the brake pedal by the driver during travel include noises in various frequency bands. The sensitivity of the driver for respective noises are different from one another, and thus timings at which squeal control is desired are different. Thus, it is desirable that the starting conditions of squeal reducing control, and control for reducing squeal can be set individually by the driver.

But in the control devices of the above-described publications, setting the control start conditions according to the will of the driver is not considered at all. In particular, in the control device of JP patent publication 9-221013, since a squeal is detected by a brake squeal detecting means and the squeal control is carried out based on the detection signal, if the detection of a squeal is incomplete, there is a fear that the will of the driver is not met, thus causing uncomfortableness.

Also, in the control device of JP patent publication 2000-168539, a reference level for deciding whether the squeal is above or below a predetermined level is set beforehand, and the brake hydraulic pressure range is determined with the brake hydraulic pressure corresponding thereto as the creep groan generation starting hydraulic pressure and the creep groan disappearing hydraulic pressure, and the pressure is reduced in this range to prevent a creep groan. But only with such a hydraulic pressure range, it is insufficient to estimate squeals, and thus it is impossible to eliminate uncomfortable squeals according to the will of the driver. Also, for the squeal reducing action, the device may malfunction as a result of pressure change other than squeals.

An object of this invention is to provide a brake squeal control device in which control of reducing brake squeals can be carried out according to the will of the driver, and the conditions for starting squeal reduction can be individually set to meet the requirements of the driver.

SUMMARY OF THE INVENTION

According to this invention, there is provided a vehicle brake squeal control device comprising a manual switch for transmitting signals for reducing brake squeals, sensors for indicating states of travel, braking, temperatures corresponding to brake squeals when the manual switch is actuated, a memory for storing the number of operations of the manual switch for the values of the sensors, a setter for setting squeal control set values from the values of the respective stored state signals during brake squeal reduction operations, and a comparator for comparing the values of the respective state signals with the set values in the comparator whereby carrying out control for reducing brake squeals based on the results of comparison.

With the vehicle brake squeal control device having such a structure, since the intensity and kind of sounds recognized by drivers as brake squeals vary from one driver to another, squeal reducing requirements of drivers are set for individual drivers to carry out squeal control reflecting the will of the drivers to reduce squeals. Thus, in the preliminary control stage, among squeals produced during braking, squeals which each driver wishes to reduce or eliminate are determined by operating the manual switch, a predetermined frequency of operations are stored for the detected values of the sensors for indicating the respective states of travel, braking and temperatures when squeals are produced, and the level and kind of squeal which it is desired to reduce is learned. This is because the levels at which drivers want to reduce squeals vary according to the preference of drivers. Thus it is desired such that start of squeal control can be set according to the levels of the individual drivers.

At the time of every learning, for the respective state values, a predetermined process is carried out to set the squeal control set values. The predetermined process is a process for setting e.g. the maximum and minimum values of the data obtained for the respective state values, as set range values. After the set values have thus been set, squeal control by use of the manual switch is stopped and automatic squeal control is started. In the automatic squeal control, the respective state values are detected, and if they are in the ranges of the set values, squeal reducing control is automatically carried out.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
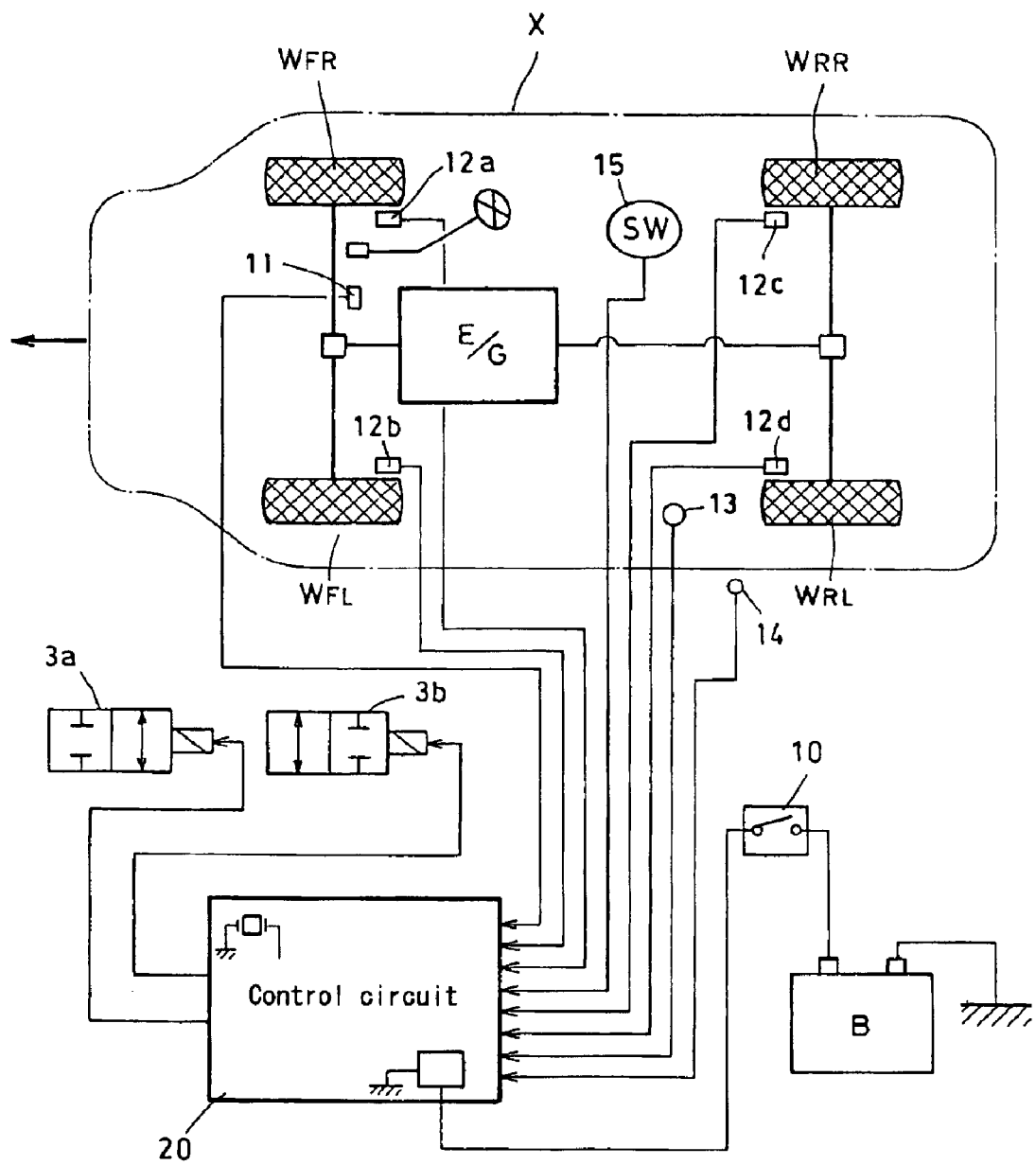
FIG. 1 is a schematic view of the vehicle brake squeal control device embodying this invention.

One embodiment of this invention will be described with reference to the drawings. As shown in FIG. 1, the vehicle X is provided with a brake hydraulic circuit (described later) of the brake device for activating the brakes with brake cylinders 5 by transmitting the stepping force of the brake pedal 1 to the brake cylinders 5, and a control circuit 20 which sends control signals to solenoid valves 3a, 3b provided in the hydraulic circuit. To the control circuit 20, signals from various sensors are sent for brake squeal control.

Figure 2:
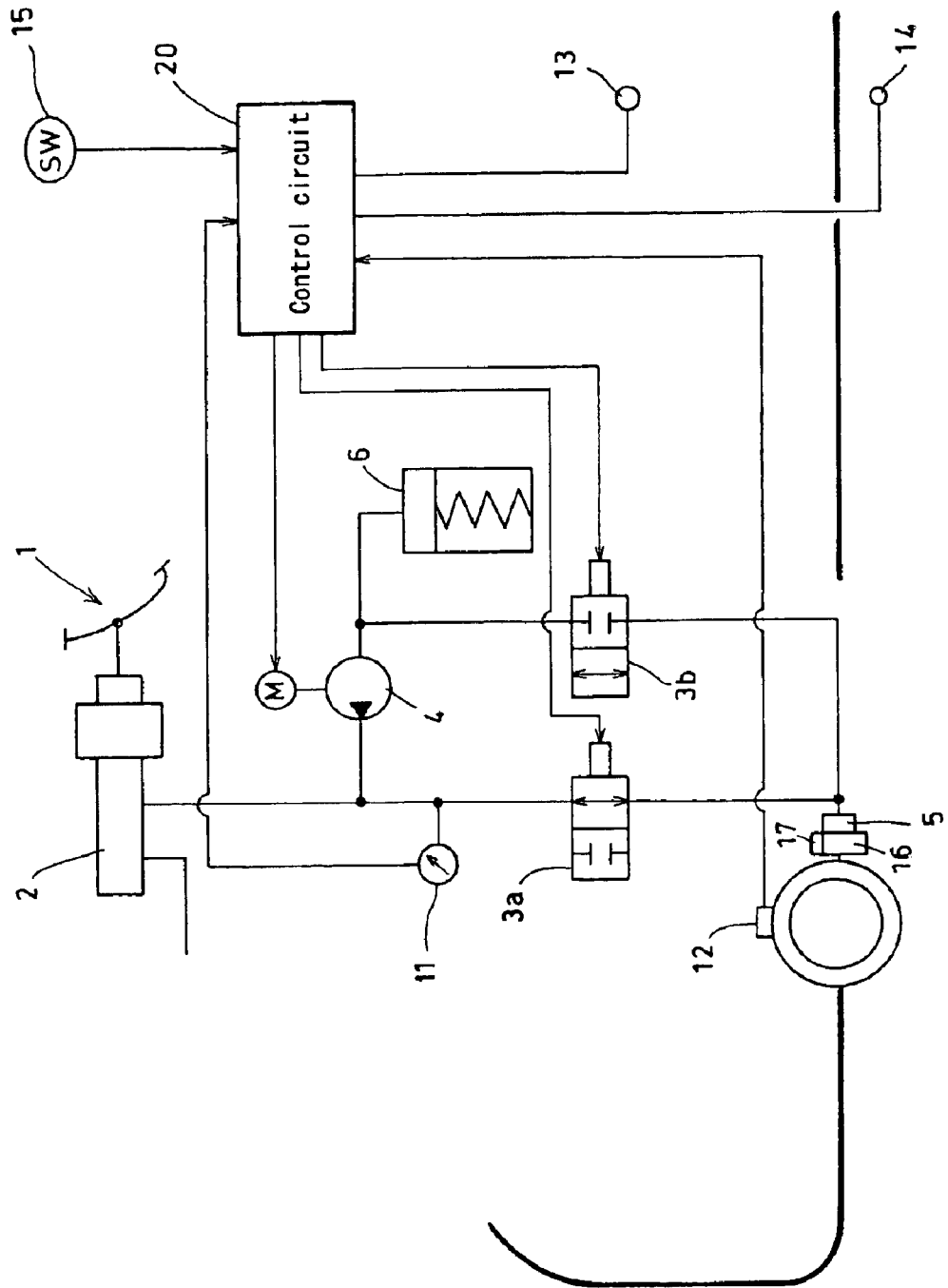
FIG. 2 is a schematic view of a brake device in which the control device of FIG. 1 is to be installed.

The brake hydraulic circuit is one example of means for specific control for reducing squeals. As shown in FIG. 2, the stepping force of the brake pedal 1 is amplified in a master cylinder 2 from which hydraulic pressure is sent to the brake cylinder 5 through solenoid valve 3a of hold valve to produce braking action. The solenoid valves 3a, which are hold valves, are normally closed two-position changeover valves. The solenoid valve 3b, which are decay valves, are normally closed valves. They are controlled by signals from the control circuit 20. The solenoid valves 3a, 3b are provided for all four wheels, but ones for only one wheel are shown for simplicity. A hydraulic pump 4 and a reservoir 6 are provided.

With this brake hydraulic circuit, when the brake pedal 1 is stepped, the hydraulic pressure generated in the master cylinder 2 is fed to the brake cylinders 5 through the solenoid valves 3a, which are open, so that the brakes are actuated. During actuation of the brakes, the solenoid valves 3b are closed. When the brake pedal 1 is released, fluid in the brake cylinders 5 is returned through the solenoid valves 3a into the master cylinder 2, so that the brakes are released. The illustrated brake hydraulic circuit is structured such that in carrying out such basic braking action, it can perform ABS (antilock brake system) control. A program for ABS control is stored in the control circuit 20. Since the ABS control program itself is known, it is described briefly here.

In the ABS control, wheel speeds are computed based on input signals from wheel speed sensors 12a–12d, and the vehicle speed is estimated from the wheel speeds and the deceleration detected by a G sensor (not shown). Opening the solenoid valves 3b (solenoid valves 3a are closed) to release lockup of the wheels only for a short period based on the value of the estimated vehicle speed, and closing the solenoid valves 3b to re-pressurize for braking the wheels are repeated to recover reduction in the friction coefficient as much as possible for effective control. Brake fluid discharged from the brake cylinders 5 by opening the solenoid valves 3b is returned into the reservoir 6, and is sucked by the hydraulic pump 4 and fed as necessary to the hydraulic circuit from the master cylinder 2.

For such a brake device, the brake squeal control device comprises a hydraulic pressure sensor 11 for the brake circuit, the wheel speed sensors 12 (12a–12d), a manual switch 15 for sending signals for squeal reducing operation, and the solenoid valves 3a, 3b, etc. Also, besides these various sensors, detection signals from various temperature sensors are sent to the control circuit 20. In the control circuit 20, the action of the solenoid valves 3a, 3b is controlled based on detection signals from these switches and sensors to carry out brake squeal control. The program for squeal control will be described later.

Figure 3:
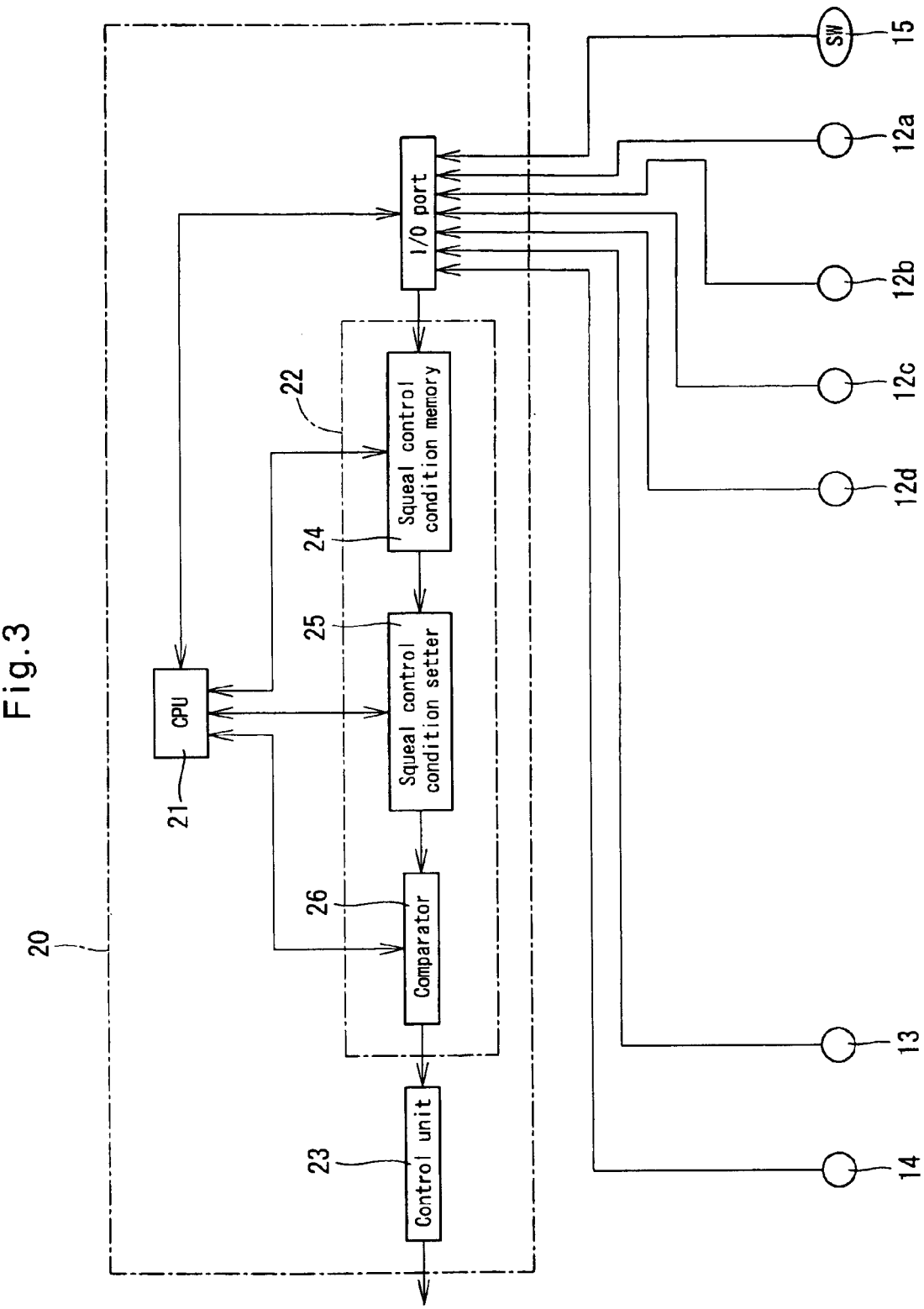
FIG. 3 is a control circuit of the control device of FIG. 1.

As sensors for detecting travel and braking states, the wheel speed sensors 12a–12d and hydraulic pressure sensor 11 are provided. As temperature sensors, a passenger compartment temperature sensor 13 and an outer air temperature sensor are provided. These sensors are for detecting conditions of travel, braking and temperature when brake squeal has occurred, and are put into a measurable state simultaneously with the closing of the starting switch 10 of the vehicle X. For the control circuit 20, as shown in FIG. 3, an ordinary microcomputer comprising a central processing unit (CPU) 21 and a memory portion 22. The memory portion 22 includes a squeal control condition memory portion 24, a squeal control condition setting portion 25, and a comparator 26. As described later, if squeal control is carried out in response to the signal from the manual switch 15, after storing the values of signals indicating the states of travel, braking and temperature in the squeal control condition memory portion 24, a control signal for carrying out squeal control based on the switch signal is given from the control portion 23.

If the squeal control is carried out automatically, squeal control conditions that indicate the will of the driver are set in the setting portion 25 based on the values of the memorized signals indicating the states of travel, braking and temperature. The comparator 26 compares this set value with the value of the detected state signal to determine whether or not to output a control signal.

With the thus structured brake squeal control device of the embodiment, squeal control is carried out as follows.

The brake squeal control of this embodiment includes preliminary control in which if the driver feels a squeal which he wants to reduce, first, the manual switch 15 is manually operated to carry out squeal control, and automatic squeal control in which state values detected by sensors 11 and 12 which indicate travel and braking states obtained by the preliminary control and temperature values by the temperature sensors 13, 14 are memorized and learned, and after setting values corresponding to a squeal which the driver wants to reduce the most, squeal reducing control is carried out automatically by comparing the state values with the set values. In the preliminary control, since the kinds of squeals which the driver wants to reduce are variously different, the number of times of squeal control by use of the manual switch 15 is set at a predetermined number of times N. The detected values by various sensors for travel, braking and temperatures for every squeal control repeated during this time are stored in a memory.

The predetermined number of times N is preferably set to a number of times suitable to grasp the will of the driver, e.g. 10 times in the below-described actual program, and if this number is exceeded, it proceeds to automatic squeal control. The values detected by the sensors 11, 12 of the travel, braking and temperature states and stored at this period of time are vehicle speed values and brake hydraulic pressure values, and the values detected by the temperature sensors 13, 14 are outer air temperature, vehicle room temperature, etc. These values thus stored are subjected to predetermined treatment every time the manual switch 15 is operated once to set respective range values (upper and lower limit values) to learn squeal control. This predetermined treatment is to set a range value among the measured values (e.g. the vehicle speed value has a certain variation according to the kind of squeal and braking state). The range value may be the upper and lower limits in such variation, or a certain range in all the measured values.

Figure 4:
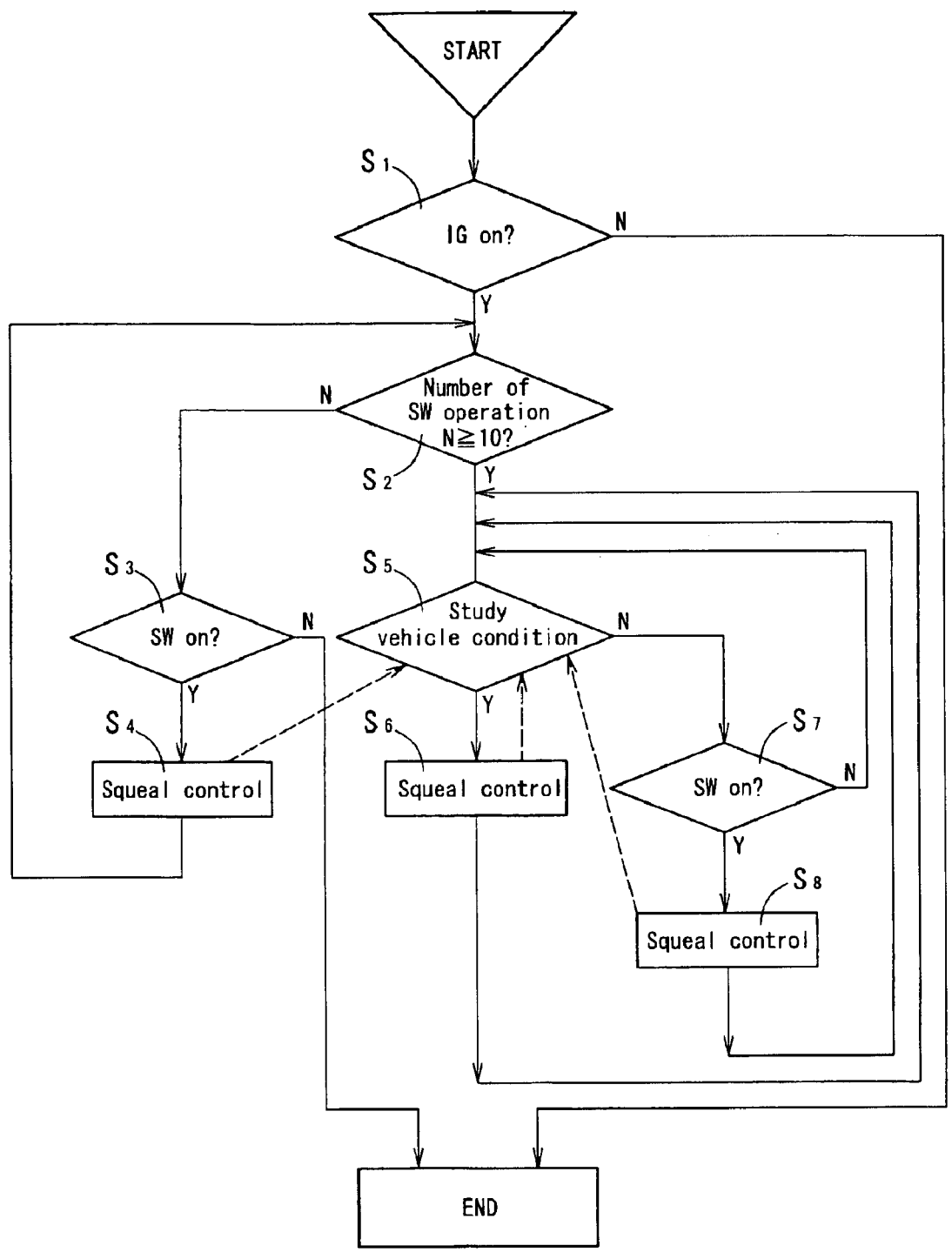
FIG. 4 is a flowchart of brake squeal control.

This brake squeal control will be described in more detail with reference to the flowchart of FIG. 4. First in step S1, confirmation is made as to whether the ignition switch (abbreviated to IG), which is a starting switch for the vehicle, is on. In S2, confirmation is made as to whether the number N of operation of the manual switch 15 is 10 or over. It is determined whether to carry out the preliminary control (if the number is less than 10) or whether to carry out the automatic squeal control (if the number is not less than 10). In the initial control, since the operating frequency is naturally not more than 10, it proceeds to the next step S3 where the manual switch 15 is operated. But the manual switch 15 is pressed when a squeal is produced for which the driver feels it necessary to carry out squeal control. It is not pressed every time when any squeal is produced.

In S3, if the manual switch 15 is operated, in the control condition memory portion 24 of the control circuit 20, the wheel speed values of wheel speed sensors 12a–12d, which indicate the corresponding travel state during squeal control, the hydraulic pressure value of the hydraulic pressure sensor 11 in the brake circuit, which indicates the braking state, and the temperature values of the temperature sensors 13 and 14 are stored. Though not shown, in order to determine the number N of operation of the manual switch 15 in S2, if the switch is operated in S3, the operating frequency N is set in a counter, and every time the switch is operated once, the operating frequency N is counted up.

As described above, if the manual switch 15 is operated in S3, a control signal is output from the control portion 23 in S4. Thus, even while the brakes are being actuated through the solenoid valves 3a and 3b, brake squeal control is carried out by opening the solenoid valves 3b, which are on the discharge side, to reduce brake pressure. In this case, the degree of opening of the discharge-side solenoid valves 3b is not kept open but opened for such a short time that the squeal will decrease (for example, only a few seconds), and closed again for re-braking. After squeal control has been made, it returns to step S2. If switch is not operated in S3, control ends without carrying out any squeal control.

In the preliminary control, every time the driver feels like reducing or eliminating a squeal, squeal control is carried out a plurality of times, and by the operation of the manual switch 15 until the switch operating frequency N exceeds 10 times. And the values stored during this time are subjected to the predetermined treatment to set values in predetermined ranges for the respective stored values in the squeal control condition setting portion 25. The setting of the set values is carried out and renewed every time the switch is operated.

In the determination in S2, if the switch operating frequency N exceeds 10, it proceeds to S5. Thereafter, the squeal control is basically automatically carried out. In S5, the current values of the hydraulic pressure sensor 11, wheel speed sensors 12 (12a–12d) and temperature sensors 13, 14 are input into the control circuit 20 and compared with the squeal control set values in the comparator 26. If all of the current values are within the ranges of the squeal control set values, it is determined that the squeal which the driver wishes to reduce or eliminate is being produced, so that squeal control is carried out with control signals from the control 23. The squeal control itself is the same as the squeal control carried out in S4.

But in the determination of S5, all of the current values of the respective state values detected by the respective sensors are not necessarily within the ranges of the squeal control set values. One or some of the state values may be out of the ranges of the set values, and still, they are squeals which the driver wishes to reduce or eliminate. In this case, it proceeds to S7 where it is confirmed whether or not there exists an operation signal of the manual switch. If the signal of the manual switch 15 is confirmed, squeal control is carried out based on this signal in S8. When the squeal control ends, it returns to S5.

In this case, too, the sensor values that are out of the ranges of the squeal control set values are temporarily stored, and these values are sent to the squeal condition setting portion 25 to renew the set values set previously, thus setting them as new set values. By going through such a process, the learned vehicle conditions will become more suitable values, so that in the determination in the later step S5, squeal control is carried out in S6 under conditions required by the driver. But the requirements of the driver may not be necessarily satisfied with only one time manual switch operation in S7. It may have to be repeated several times.

Thus, in this case, operation of the manual switch 15 in S7 is repeated. But if the operation of the manual switch 15 is repeated at high frequency, it is expected e.g. that the wear of the pads has progressed. Thus, while not shown, it is preferable to warn with a warning lamp the fact that the frequency of the squeal control in S6 has reached a predetermined number. Warning may be by a buzzer, sounds or character/symbol/figure indication.

Although as a sensor for sensing the braking state, the hydraulic pressure sensor 11 is used in the abovesaid embodiment, it may be any other sensor if it can indicate the driver's intention to brake the vehicle. For exampre, when the brake is operated, the fluid pressure generated in the brake cylinder 5 is transmitted through the pad 16 to the wheels. Thus the sensor for sensing the braking state may be a pressing force sensor 17 (FIG. 2) for sensing the pressing force applied to the pad 16 in the caliper portion.

In the illustrated embodiment, the brake device is a hydraulic pressure recovering type using a hydraulic pump and a reservoir. But it may be a brake device of a hydraulic pressure recovering type using a combination of a hydraulic pump and an accumulator. In this case, it is possible to employ a type in which brake squeals are controlled by increasing the brake hydraulic pressure. Also, as in JP patent publication 2000-283193, it is applicable to a type in which braking force is produced by means other than hydraulic pressure (for example, electric brake type).

Further, squeal control may be carried out by applying reverse piezoelectric effect with a piezoelectric element as disclosed in JP patent publication 4-54325. Also, for the cases in which a non-driving passenger presses the manual switch, or a plurality of drivers drive the car, a plurality of set values may be set for respective drivers.

As described in detail, the brake squeal control device of this invention learns in preliminary control by detecting values from sensors that indicate states such as travel, braking and temperatures about squealing in which the will of squeal control is set by operating a manual switch, and after setting squeal control set values, detects the respective state values and carries out automatic squeal control if the state values are in the ranges of the set values. Thus, it is possible for the driver to individually set the conditions for starting squeal reduction control. This allows squeal control reflecting the will of the driver. Thus, squeal control can be started to meet the will of individual drivers.

What is claimed is:

1. A vehicle brake squeal control device comprising:
    a control circuit:
    a manual switch for transmitting a signal to said control circuit every time said manual switch is operated; and
    a plurality of sensors for transmitting signals indicative of states of travel and braking and temperatures corresponding to brake squeals;
    said control circuit comprising:
        a memory for storing the signals transmitted from said sensors when said manual switch is operated;
        a setter for setting squeal control values based on the signals stored in said memory when the number of times said manual switch is operated has reached a predetermined value;
        a comparator for comparing, after said squeal control values have been set, the signals transmitted from said sensors with said squeal control values to determine whether the signals transmitted from said sensors are within a range of said squeal control values; and
        a brake squeal controller for issuing a command for reducing brake squeals if it has been determined by said comparator that the signals transmitted from said sensors are within the range of said squeal control values, or when the signal from said manual switch is entered into said control circuit.

2. A brake squeal control device for a vehicle as claimed in claim 1 wherein if the signals transmitted from said sensors after setting the squeal control values are outside the range of said squeal control values, said squeal control values that have been set are renewed based on the signals transmitted from the sensors when the manual switch is operated.

3. A brake squeal control device for a vehicle as claimed in claim 1 wherein said plurality of sensors include wheel speed sensors for indicating the travel state, a hydraulic pressure sensor in a hydraulic circuit for indicating the braking state, and a vehicle interior temperature sensor and an exterior temperature sensor for indicating the temperature state.

4. A brake squeal control claimed in claim 1 wherein the plurality of sensors include a pressure force sensor for sensing a pressing force applied to a pad in a caliper portion to indicate the braking state.

5. A brake squeal control device for a vehicle as claimed in claim 2 wherein said plurality of sensors include wheel speed sensors for indicating the travel state, a hydraulic pressure sensor in a hydraulic circuit for indicating the braking state, and a vehicle interior temperature sensor and an exterior temperature sensor for indicating the temperature state.

* * * * *